UNITED STATES PATENT OFFICE.

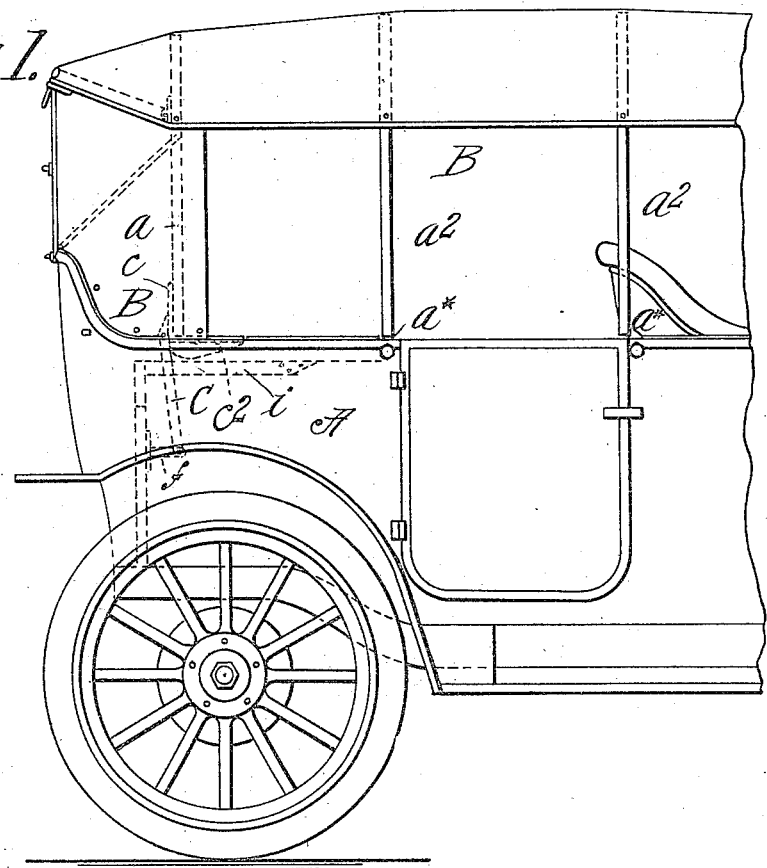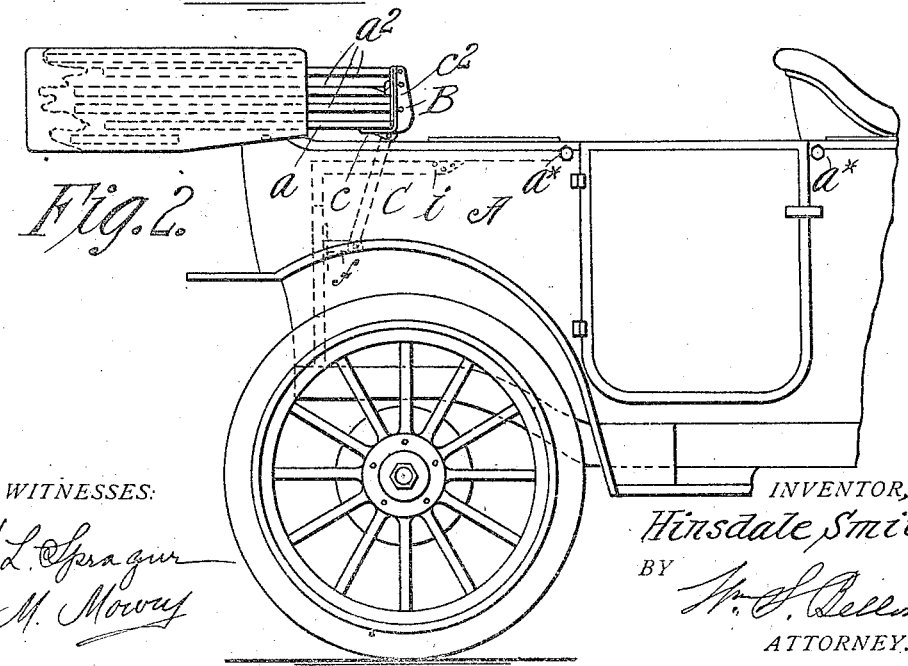

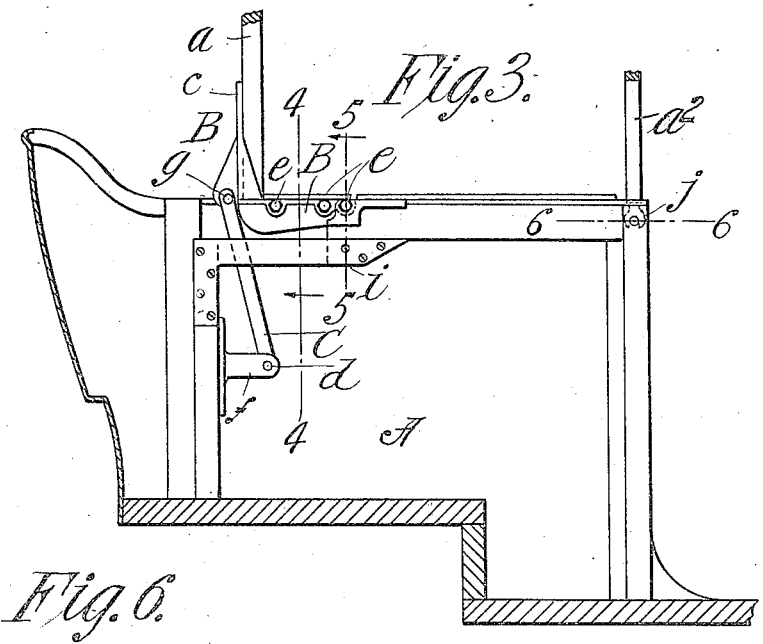
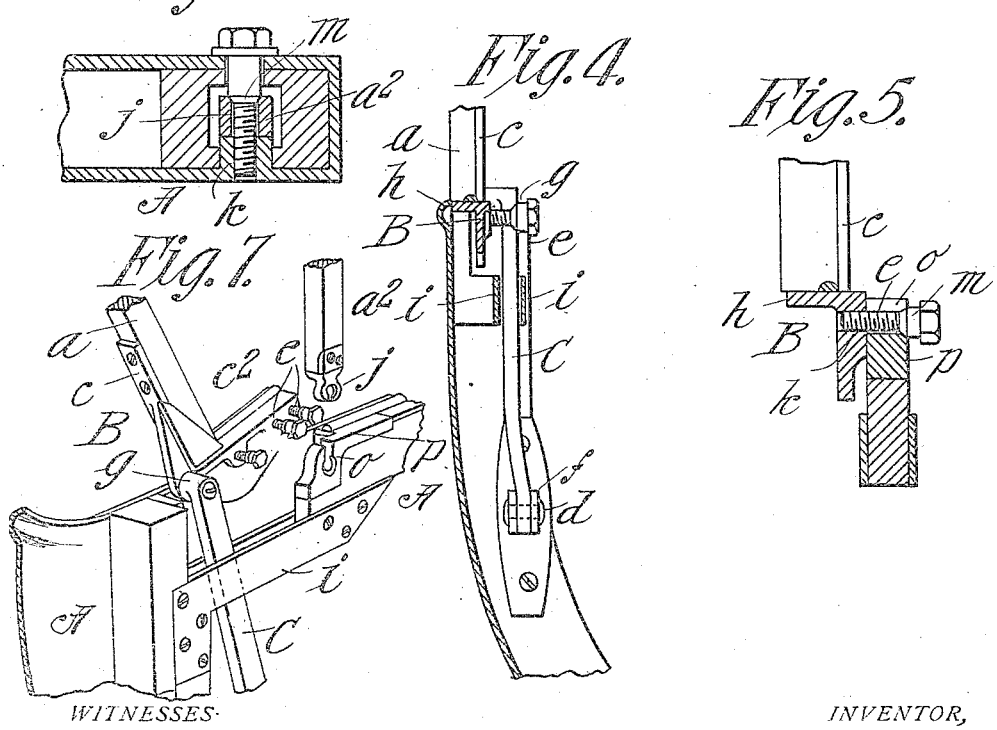

HINSDALE SMITH, OF SPRINGFIELD, MASSACHUSETTS, ASSIGNOR TO THE SPRINGFIELD BODY COMPANY, OF SPRINGFIELD, MASSACHUSETTS, A CORPORATION OF MASSACHUSETTS.

FOLDING TOP FOR AUTOMOBILES.

1,170,570.  Specification of Letters Patent.  Patented Feb. 8, 1916.

Application filed August 5, 1912. Serial No. 713,439.

*To all whom it may concern:*

Be it known that I, HINSDALE SMITH, a citizen of the United States of America, and resident of Springfield, in the county of Hampden and State of Massachusetts, have invented certain new and useful Improvements in Folding Tops for Automobiles, of which the following is a full, clear, and exact description.

This invention relates to improvements in convertible automobile bodies of a kind such as set forth in application for Letters Patent of the United States filed by me Feb. 20, 1911, Serial No. 609,564. In such a body is comprised the combination with a pair of brackets oppositely located at the rear portion of the automobile body, of a foldable top including a plurality of bows adapted to have suitably widely separated relations, the rear one of which has the depending members thereof secured to said brackets and the bows forward of such rear one adapted while in their separated relations to be detachably supported on the sides of the body, and to be in their folded relations detachably connected to and supported by said brackets, and members, located at opposite rear portions of the body and adapted for movements forwardly and rearwardly, to which the said brackets are pivotally connected, so that the bows of the automobile top when collapsed and having their supporting connections with the said brackets may be swung down to a more or less nearly horizontal position and then moved forwardly, to decrease the extent of overhang of the folded top at the rear of the vehicle.

An object of this invention is to provide improved devices of simpler character than those shown in the aforesaid application for patent, and which may be more conveniently operated especially when the forward bodily displacement of the horizontally swung folded top is to be accomplished.

Another object is to provide a pair of brackets pivotally mounted on or jointed to a suitable support therefor at the rear portion of the automobile body, by which brackets the depending members of the rear bow are carried and with which bracket the depending members of a forward bow or bows are detachably connected and having combined therewith means for detachably locking such brackets to the automobile body so that when the brackets are swung to their positions to accord with the set up condition of the top the brackets are as rigid appurtenances of the body and will support the rear bow in a firm and substantial manner and immovable relatively to the rear portion of the body.

Other objects are to improve the device in respect to minor features thereof as will hereinafter appear.

The invention is described and claimed in conjunction with the accompanying drawings and is defined in the claims.

In the drawings: Figure 1 is a side elevation of the rear portion of a convertible body automobile, the top of which is in its set-up position whereby the vehicle is a closed one resembling a limousine or landaulet and relatively to which the devices of the present invention are applicable. Fig. 2 is a view similar to Fig. 1, but showing the foldable top as in the position which it has when folded and down. Fig. 3 is a sectional elevation through the rear portion of the body and more particularly showing the devices in which the present invention is comprised. Fig. 4 is a vertical cross sectional view on line 4—4, Fig. 3. Fig. 5 is a vertical cross sectional view on line 5—5, Fig. 3. Fig. 6 is a horizontal sectional view of parts in detail as drawn on line 6—6, Fig. 3. Fig. 7 is a perspective view for affording clearer illustration of the construction and capability of the improved devices.

Similar characters of reference indicate corresponding parts in all of the views.

In the drawings, A represents the body of an automobile, of which B is the foldable top, the same comprising a plurality of bows $a$ $a^2$, adapted to have suitably widely separated relations when the top is set up, as shown in Fig. 1; and the rear one of such bows $a$ has its depending members or legs permanently secured to the upstanding members $c$ of L-shaped brackets B oppositely located at the rear portion of the body and near the upper edge of the body sides. The depending members of the forward bows while in their separated relations shown in Fig. 1 are adapted to be detachably supported at $a^*$, $a^*$, on the sides of the body and to be also in their folded relation represented in Fig. 2 connected to and supported by the duplicate brackets B, substantially as done, excepting as regards minor details, in the convertible body fully described and shown in the aforementioned application.

C represents a link duplicated at the opposite sides of the body, arranged more or less nearly vertical; and each of these links has its lower end, by pivot $d$, connected to the body, the attachment being by the provision of a fixed lug or bracket $f$ screwed on a suitable post-like part provided on the inside of the body. Each bracket B of suitably angular form as shown in Figs. 3 and 4 is at its elbow by pivot $g$ connected to the upper end of the link C at the side of the automobile body corresponding thereto, so that the bracket may be swung from its normal position represented in Fig. 3 and partially indicated in Fig. 1 to a quarter turned position shown in Fig. 2.

When it is desired to convert the body from a closed limousine form to an open one, the legs or depending members of the top sustaining bows are disconnected from their supports at $a^*$ forward of the brackets and brought to connection with the brackets. The L-shaped brackets are then rocked from the position shown in Fig. 3 to the position shown in Fig. 2, and then they are bodily swung, and the folded top therewith on the links C to accomplish a bodily forward displacement of the then horizontal bracket supported top so as to materially diminish the rearward overhang of the top.

$i$ $i$ represent metallic bars suitably supported on the inner sides of the body and ranging in separation and parallelism with each other, fore and aft, to serve as guides for the links, and as means for restraining them against distortion by reason of any transverse force which may be brought thereagainst.

The tiltable or rocking L-shaped brackets B have their lower members $c^2$ widened or made with outwardly extending flanges $h$, as shown, which flanges form flush continuations of the upper edges of the side walls of the body; and means are provided for temporarily locking each bracket when in its position shown in Figs. 1 and 3 firmly to the side of the body so that when the top is up the rear bow connected to the duplicated brackets cannot shift, swing or rattle relatively to the body. The particular means here shown for forming the detachable connections between the depending members of the bows and the parts on which they are interchangeably supported,—such parts being the body sides at times and the brackets at other times,—will be now described.

The lower ends of the depending members of the bows have apertures $j$, preferably by making the extremities of such members bifurcated; the supporting part is made with a horizontal transverse screw threaded hole $k$; and screws $e$ are provided for engagement in said holes, portions of the shanks thereof passing through the apertures $j$, and such screws have enlargements endwise beyond their threaded shanks with tapered shoulders $m$ at the junction of the shanks and the enlargements, such tapered shoulders engaging the faces of the bows marginally of their apertures so that when screwed home they force and hold the bows tightly facewise against the supporting parts, such supporting part in Fig. 5 being seen as the tiltable and swinging bracket, and in Fig. 6 as a solid part of the side wall of the body.

The device for bodily forwardly moving the top supporting brackets here described and shown is an extremely satisfactory, practical and desirable one for the reason that in the operation of the bodily swinging of the top forward, after the same has been folded and lowered, there is no tendency of cramping or binding; but on the other hand the action is one of entire ease and convenience.

In the device as actually constructed and here represented, the forward one of the screw studs $e$ performs the double duty of serving as a means of detachably confining the forward bow on the bracket when the top is to be folded and of locking the bracket in its position shown in Figs. 1 and 3 when the top is distended and set up. It will be noticed in this connection, especial reference being had to Figs. 5 and 7, that the side portion of the body A near its upper edge is provided with an upwardly opening socket or recess $o$, the same being formed in a metallic casting or fitting $p$ inset in the body side and outside of which the extremity of the member $c^2$ of the bracket slightly facewise overlaps. When the forward one of the several bows $a^2$ is disconnected from the bracket and the bracket is swung to the position shown in Fig. 3, an intermediate portion of the forward screw stud $e$ is engaged in the upwardly opening socket or recess $o$, and then by inwardly screwing the stud, its tapered shouldered part $m$ firmly engages against the inner face of the socket provided fitting, and in the firmest possible manner holds the bracket locked and immovable and against the possibility of swinging, shifting or rattling relatively to the body.

Inasmuch as I claim as original with me the provision of a bracket pivotally mounted on the rear portion of an automobile body by which a rear bow of the folding top is carried and with which bracket one or more other bows are detachably connected, and means for locking, when the top is up and distended, the said bracket firmly and immovably relatively to the body, I do not wish to be confined to any particular form of locking devices, nor necessarily to the swinging or tiltable bracket for which the locking means is provided, supported at the upper end of a swinging link.

I claim:—

1. The combination with an automobile body, of oppositely located brackets at its rear portion, a foldable top comprising a plurality of bows adapted to have suitably widely separated relations, the rear one of which has its depending member secured to said brackets and the bows forward of the rear one adapted, while in such separated relations, to be detachably supported on the sides of the body and to be also in their folded relations detachably connected to, and supported by, said brackets, approximately vertical links, at opposite sides of the body, having their lower ends pivoted to the latter and to the upper ends of which said brackets are pivoted, and means for detachably locking said brackets to the sides of the automobile body.

2. The combination with an automobile body, of oppositely located brackets at the rear portion, a foldable top, the bows of which are supported by and foldable and distensible relatively to said brackets, said bows provided with an aperture on their free ends, screws positioned in spaced relation on the brackets for engagement with said apertures when the top is folded, and links having one end pivotally connected to the rear end of said brackets, the other end of said links pivotally secured on said body for supporting and shifting the top of said body in its folded position, guides for the links and a recess provided in said body for receiving locking means carried by the brackets thereby locking the brackets with reference to the body.

3. The combination with an automobile body, a foldable top having a plurality of bows, of oppositely located bodily movable L shaped brackets at its rear portion having their lower members provided with outwardly extending flanges, which flanges form flush continuations of the upper edges of the side walls of the body, means whereby said movement may be effected and means provided for temporarily locking each bracket when flush with the edges of said walls to the side of the body so that when the top is up the rear bow connected to the duplicated brackets cannot move relatively to the body.

4. The combination with an automobile body, of oppositely located brackets at its rear portion, a section of said bracket flush with the upper edge of said body, a foldable top comprising a plurality of bows adapted to have suitably widely separated relations, the rear one of which has its depending member secured to said brackets and the bows forward of the rear one adapted while in such separated relation to be detachably supported on the sides of the body and to be also in their folded relations detachably connected to and supported by said brackets, approximately vertical links at opposite sides of the body, having their lower ends pivoted to the latter and to the upper ends of which said brackets are pivoted, and means for detachably locking said brackets to the sides of the automobile body.

5. The combination with an automobile body, of oppositely located brackets at its rear portion, means for detachably locking said brackets to the sides of the automobile body, a foldable top comprising a plurality of bows adapted to have suitably widely separated relations, the rear one of which has its depending member secured to said brackets and the bows forward of the rear one adapted while in such separated relation to be detachably supported on the sides of the body and to be also in their folded relations detachably connected to and supported by said brackets, approximately vertical links at opposite sides of the body having their lower ends pivoted to the latter and to the upper ends of which said brackets are pivoted.

Signed by me at Springfield, Mass., in presence of two subscribing witnesses.

HINSDALE SMITH.

Witnesses:
Wm. S. Bellows,
G. R. Driscoll.

Copies of this patent may be obtained for five cents each, by addressing the "Commissioner of Patents, Washington, D. C."